United States Patent
van de Veerdonk et al.

(10) Patent No.: US 7,029,773 B2
(45) Date of Patent: Apr. 18, 2006

(54) METHOD AND SYSTEM FOR MAGNETIC RECORDING USING SELF-ORGANIZED MAGNETIC NANOPARTICLES

(75) Inventors: René J. M. van de Veerdonk, Pittsburgh, PA (US); Xiaowei Wu, Pittsburgh, PA (US); Dieter K. Weller, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 143 days.

(21) Appl. No.: 10/683,383

(22) Filed: Oct. 10, 2003

(65) Prior Publication Data

US 2005/0078397 A1  Apr. 14, 2005

(51) Int. Cl.
*G11B 5/64* (2006.01)
(52) U.S. Cl. ............. 428/836; 428/836.1; 428/848.1
(58) Field of Classification Search .............. None
See application file for complete search history.

(56) References Cited

U.S. PATENT DOCUMENTS

| | | | |
|---|---|---|---|
| 4,805,145 A | 2/1989 | Umemura | |
| 5,298,760 A | 3/1994 | Fuchs et al. | |
| 5,740,101 A | 4/1998 | Fuchs et al. | |
| 6,162,532 A | 12/2000 | Black et al. | |
| 6,262,129 B1 | 7/2001 | Murray et al. | |
| 6,302,940 B1 | 10/2001 | Murray et al. | |
| 2002/0132083 A1 | 9/2002 | Weller et al. | |
| 2004/0071924 A1* | 4/2004 | Yang et al. | 428/65.3 |
| 2005/0009079 A1* | 1/2005 | Anders et al. | 435/6 |

FOREIGN PATENT DOCUMENTS

| | | |
|---|---|---|
| EP | 0 977 812 A2 | 2/2002 |
| EP | 0 977 812 A3 | 2/2002 |
| EP | 1 226 878 A2 | 7/2002 |
| EP | 1 226 878 A3 | 7/2002 |
| FR | 2 773 632 A | 7/1999 |

OTHER PUBLICATIONS

A. E. Berkowitz et al., "Spin Pinning At Ferrite-Organic Interfaces", *Physical Review Letters*, vol. 34, No. 10, pp. 594-597 (Mar. 1975).

(Continued)

*Primary Examiner*—Kevin M. Bernatz
(74) *Attorney, Agent, or Firm*—Benjamin T. Queen, II; Pietragallo, Bosick & Gordon LLP (57) ABSTRACT

A method and system for magnetic recording using self-organized magnetic nanoparticles is disclosed. The method may include depositing surfactant coated nanoparticles on a substrate, wherein the surfactant coated nanoparticles represent first bits of recorded information. The surfactant coating is then removed from selected of the surfactant coated nanoparticles. The selected nanoparticles with their surfactant coating removed may then be designated to represent second bits of recorded information. The surfactant coated nanoparticles have a first saturation magnetic moment and the selected nanoparticles with the surfactant coating removed have a second saturation magnetic moment. Therefore, by selectively removing the surfactant coating from certain nanoparticles, a write operation for recording the first and second bits of information may be performed. A read operation may be carried out by detecting the different magnetic moments of the surfactant coated nanoparticles and the non-surfactant coated nanoparticles.

10 Claims, 6 Drawing Sheets

OTHER PUBLICATIONS

S. Sun et al., "Monodisperse FePt Nanoparticles And Ferromagnetic FePt Nanocrystal Superlattices", *Science*, vol. 287, pp. 1989-1992 (Mar. 2000).

S. Anders et al., "Lithography And Self-Assembly For Nanometer Scale Magnetism", *Microelectronic Engineering*, vol. 61-62, pp. 569-575, Jul. 2002.

* cited by examiner

FIG. 3

|←20nm→| *FIG. 4a*

$D_{median} = 3.1\,nm$
$\sigma = 0.05$

METHOD AND SYSTEM FOR MAGNETIC RECORDING USING SELF-ORGANIZED MAGNETIC NANOPARTICLES

FIELD OF THE INVENTION

The present invention relates to magnetic recording and, more particularly, to a method and system for magnetic recording that utilizes a magnetic recording media having self-organized magnetic nanoparticles.

BACKGROUND INFORMATION

In the field of magnetic recording, areal density is an important factor driving the design of future magnetic recording systems. Increased storage capacity in magnetic recording has traditionally been addressed through improvements in the ability to store information on a particular storage disc having an increased areal density. Conventional longitudinal and proposed perpendicular recording schemes have been projected to include areal densities of about 1 Tbpsi, but will require extensive modifications to allow further growth.

Accordingly, much attention has been directed toward either improving the various components of a conventional magnetic recording system or developing new types of magnetic recording systems. For example, self-organized magnetic arrays of nanoparticles have been produced and investigated for use as magnetic recording media for future ultra-high density magnetic recording applications. These nanoparticles may provide conceivable solutions to many proposed future recording schemes, e.g., conventional granular media, perpendicular media, thermally assisted recording media, patterned media recording schemes and probe storage systems. While much effort has been directed toward the various potential applications of the self-organized magnetic nanoparticles for use in magnetic recording media, much more effort is needed for incorporating such proposed media into an entire magnetic recording system for performing read and/or write operations.

There is identified, therefore, a need for improved magnetic recording systems that overcome limitations, disadvantages, or shortcomings of known magnetic recording systems.

SUMMARY OF THE INVENTION

An aspect of the present invention is to provide a method of magnetic recording that comprises depositing surfactant coated nanoparticles on a substrate, wherein the surfactant coated nanoparticles represent first bits of recorded information. The method also includes removing the surfactant coating from selected of the surfactant coated nanoparticles. The selected nanoparticles with their surfactant coating removed may then be designated to represent second bits of recorded information. The surfactant coated nanoparticles have a first saturation magnetic moment and the selected nanoparticles with the surfactant coating removed have a second saturation magnetic moment. Therefore, by selectively removing the surfactant coating from certain nanoparticles, a write operation for recording the first and second bits of information may be performed. A read operation may be carried out by detecting the different magnetic moments of the surfactant coated nanoparticles and the non-surfactant coated nanoparticles.

Another aspect of the present invention is to provide a magnetic recording system that comprises a recording medium having a substrate with surfactant coated nanoparticles and non-surfactant coated nanoparticles. The surfactant coated nanoparticles represent first bits of recorded information and the non-surfactant coated nanoparticles represent second bits of recorded information. The magnetic recording system also comprises means for writing the first and second bits of recorded information and means for reading the first and second bits of recorded information.

A further aspect of the present invention is to provide a method of magnetic recording that comprises depositing a layer of self-organized magnetic nanoparticles on a substrate. The method also includes altering a magnetic property magnitude of selected of the self-organized magnetic nanoparticles and designating bits of recorded information according to the magnetic property magnitude of either the self-organized magnetic nanoparticles or the magnetic property magnitude of the selected self-organized magnetic nanoparticles that were altered.

These and other aspects of the present invention will be more apparent from the following description.

DETAILED DESCRIPTION

The invention relates to magnetic recording and, more particularly, to a method and system for magnetic recording that utilizes a magnetic recording media having self-organized magnetic nanoparticles. The invention includes altering a magnetic property magnitude, such as saturation magnetic moment or other magnetic properties of the nanoparticles, of the self-organized magnetic nanoparticles and distinguishing between the unaltered and altered nanoparticles for purposes of recording bits of information.

Figure 1:
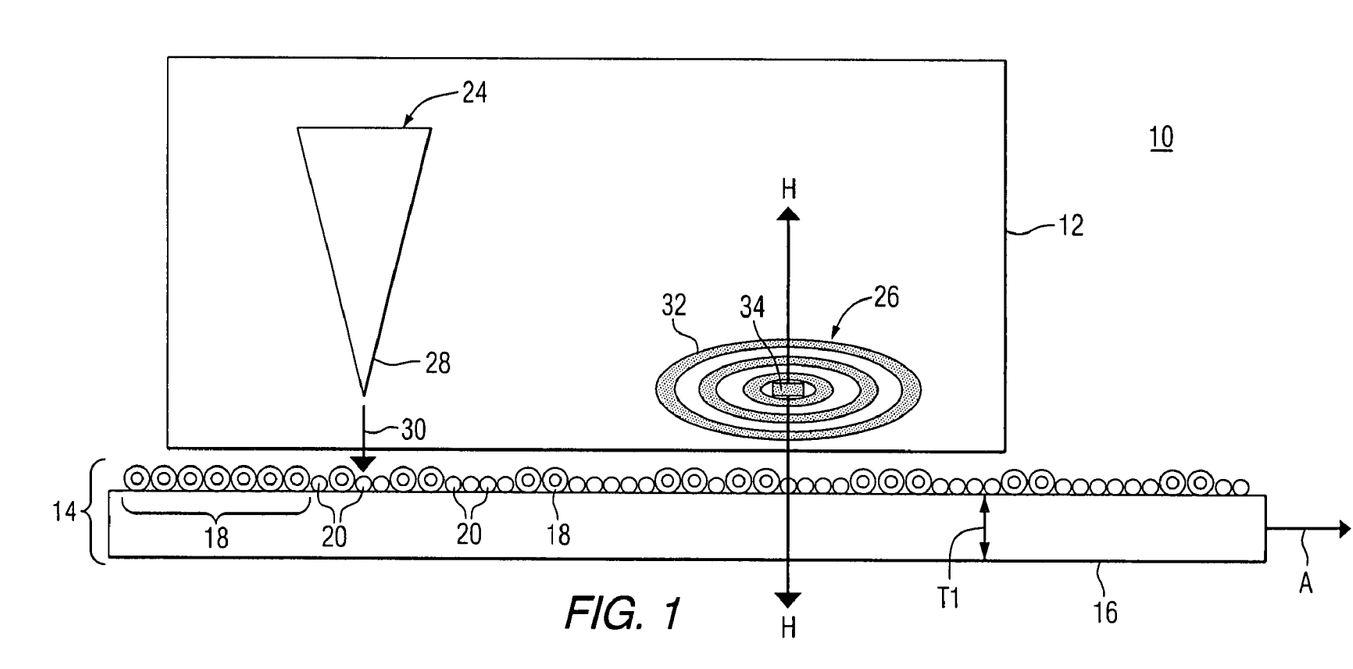
FIG. 1 is a schematic illustration of a magnetic recording system constructed in accordance with the invention.

FIG. 1 illustrates an embodiment of a magnetic recording system 10 constructed in accordance with the invention. Specifically, the recording system 10 includes a recording head 12 and a recording medium generally designated by reference number 14. The recording medium 14, which may travel in the direction of arrow A relative to the recording head 12, includes a substrate 16 and a layer of nanoparticles, generally designated by reference number 18, deposited on the substrate 16. The substrate 16 may be formed of any suitable material such as, for example, amorphous or nanocrystalline (ceramic) glass, NiP coated Al, Si, $SiO_2$, and thermally oxidized Si. The substrate 16 may have a thickness T1 in the range of about 0.1 mm to about 2.0 mm.

The layer of nanoparticles 18 may be deposited on the substrate 16 using, for example, dip-coating where the substrate 16 is submerged in a liquid containing the nanoparticles 18 and subsequently controllably extracted. Alternatively, a spin-coating process may be used where a nanoparticles-containing fluid is applied to the surface of the substrate 16 followed by a controlled spinning of the substrate 16 to remove excess materials.

Figure 2:
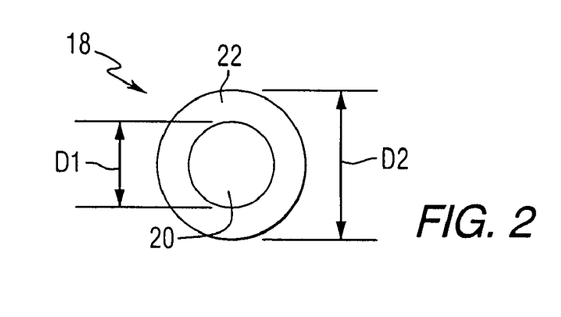
FIG. 2 is an enlarged view of a nanoparticle that may be used in accordance with the invention.

FIG. 2 illustrates an example of a nanoparticle 18 in more detail. Specifically, the nanoparticle 18 includes a nanoparticle core 20 that may be formed of, for example, FePt, CoPd, Co, CoFe, Fe or Ni. The core 20 may have a diameter D1 in the range of about 2 nm to about 8 nm. In addition, the nanoparticle 18 may have a shell 22 that at least partially surrounds the core 20. The shell 22, as will be explained in more detail herein, provides a surfactant coating around the core 20. The shell 22 may be formed of, for example, oleic-acid molecules or thiols. Accordingly, the core 20 and shell 22 combine to form a nanoparticle 18 having a total diameter D2 in the range of about 4 nm to about 12 nm.

Referring to FIG. 1, the recording head 12 includes a write element, generally designated by reference number 24, and a read element, generally designated by reference number 26. The write element 24, in one embodiment, may include an electron emitting device such as a field emission tip 28 which can be used to create a flow of electrons that form an electron current, as designated by reference number 30, from the recording head 12 toward the recording medium 14 by the application of a voltage. The field emission tip 28 controls the electron current 30, i.e., the write current, by the tip voltage.

The writing process utilizing the write element 24 generally involves the local removal of the surfactant coating or shell 22 from individual nanoparticles 18. Each nanoparticle 18, as deposited on the substrate 16, has a first saturation magnetic moment. By turning on the electron current 30, the shell 22 surrounding the core 20 of an individual nanoparticle 18 will dissolve locally leaving behind only the core portion 20. This results in a non-surfactant coated nanoparticle 20 that has a second saturation magnetic moment that is greater than the first saturation magnetic moment of the original nanoparticle 18. The details regarding local removal of the surfactant coating or shell 22 of the nanoparticle 18 in order to alter the saturation magnetic moment thereof will be described in more detail herein.

Accordingly, it will be appreciated that the original nanoparticles 18 may each be designated to represent a first bit of recorded information in the magnetic recording system 10. In addition, the non-surfactant coated nanoparticles 20 having a second saturation magnetic moment may be designated to represent second bits of recorded information for the magnetic recording system 10.

In other embodiments of the invention, the write element 24 may include, for example, a localized heat source, such as a focused laser spot or a near field optical spot for locally removing the surfactant coating or shell 22 from selected nanoparticles 18.

Referring to FIG. 1, the read element 26 of the recording head 12 is provided for performing a read operation on the surfactant coated nanoparticles 18 and the non-surfactant coated nanoparticles 20. The read element 26 is structured and arranged, in one embodiment, for detecting and distinguishing between the surfactant coated nanoparticles 18 and the non-surfactant coated nanoparticles 20. More specifically, the read element 26 is structured and arranged for detecting the saturation magnetic moment of the surfactant coated nanoparticles 18 and the saturation magnetic moment of the non-surfactant coated nanoparticles 20 and distinguishing therebetween. As described, the surfactant coated nanoparticles 18 may be designated to represent first bits of recorded information and the non-surfactant coated nanoparticles 20 may be designated to represent second bits of recorded information.

Still referring to FIG. 1, the read element 26 may include a coil 32 that produces a magnetic field H and a magnetoresistive read element 34 positioned relative to the coil 32. The magnetic field H is exposed to a particular nanoparticle, e.g., either a surfactant coated nanoparticle 18 or a non-surfactant coated nanoparticle 20, and the magnetic field H will polarize the magnetic moment of the subject nanoparticle to which it is exposed. The degree of polarization of the nanoparticles depends on the total moment of the particles, i.e., whether it is one of the surfactant coated nanoparticles 18 having a saturation magnetic moment that is less than a saturation magnetic moment of one of the non-surfactant coated nanoparticles 20. Thus, the difference in polarization between the surfactant coated nanoparticles 18 and the non-surfactant coated nanoparticles 20 can then be detected using the MR read element 34.

In another embodiment, the read element 26 rather than utilizing the described magnetic polarizing field, may employ a time varying field using a coil or microscopic electromagnet. The alternating field will polarize the nanoparticles, such as nanoparticles 18 and 20 and provide a read-back signal to the read element 26. The information can be retrieved by demodulation of the signal in the read element 26. It will be appreciated that other configurations may be employed to provide a read operation by detecting the saturation magnetic moment of the individual nanoparticles or by detecting other variable magnetic properties of the nanoparticles as well.

Figure 3:
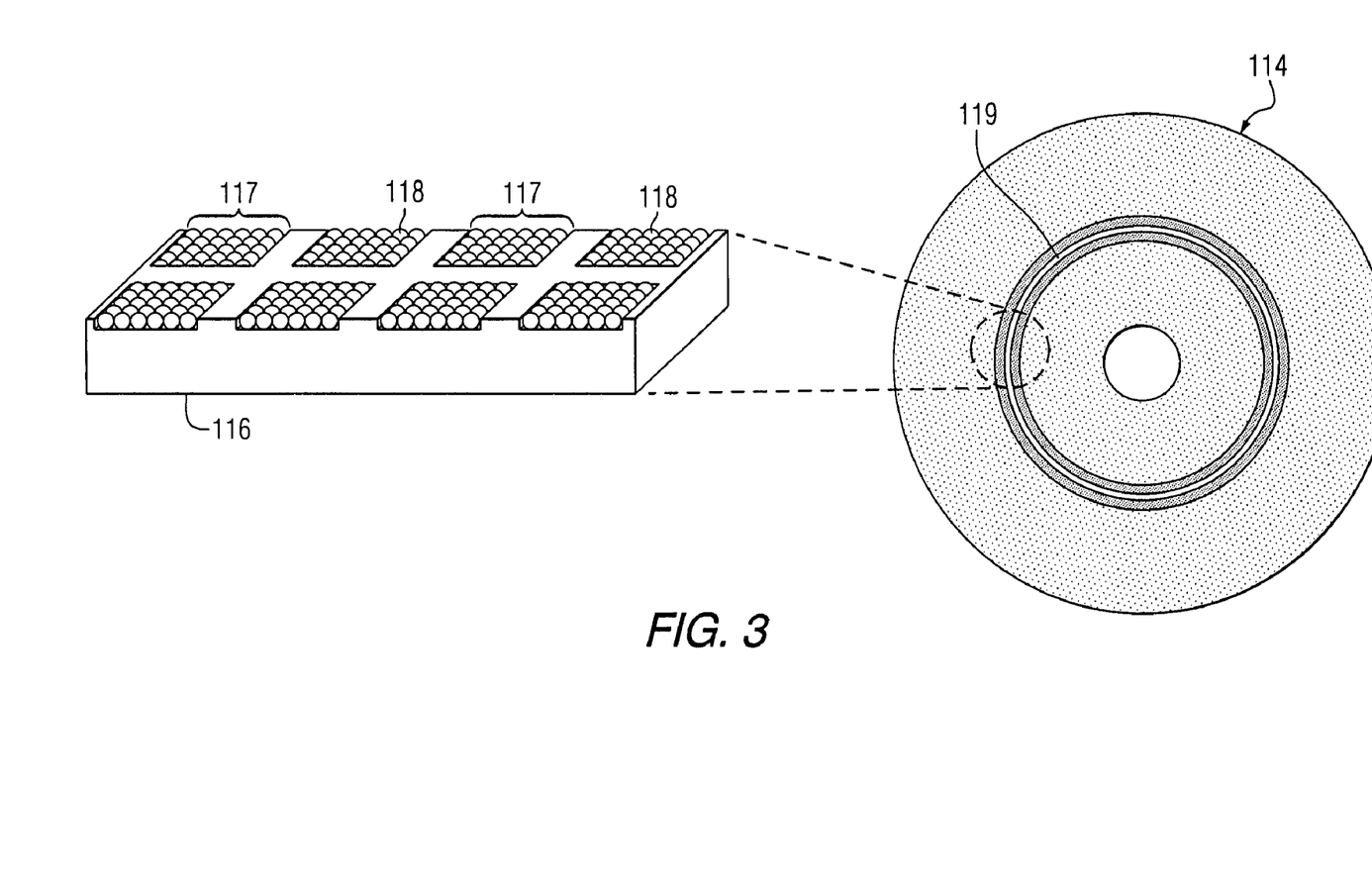
FIG. 3 is a schematic illustration of a self-organized magnetic array medium.

FIG. 3 illustrates an additional embodiment of a recording medium 114 constructed in accordance with the invention. In contrast to the recording medium 14 which includes a uniform or continuous layer of nanoparticles 18 deposited thereon in, for example, a grid type pattern or arrangement, the recording medium 114 includes arrays 117 each comprising multiple nanoparticles 118. The arrays 117 of nanoparticles 118 are deposited on a substrate 116 of the recording medium 114. The arrays 117 of nanoparticles 118 may be spatially organized in circumferential tracks 119 of the recording medium 114 by using, for example, macroscopic topographic features on a length scale smaller than the correlation length of the self-organization process during the deposition phase of the preparation. For example, this length scale can be at least several microns long. These macroscopic features can easily be fabricated to follow the desired circumferential or other pattern.

Further details regarding the theory of operation of the recording head 12 illustrated in FIG. 1 is as follows. For an ensemble of non-interacting paramagnetic nano-particles, the magnetization density M as a function of the applied magnetic field H is given by the Langevin function:

$$M = Nm[\coth(\mu_0 mH/k_B T) - k_B T/\mu_0 mH]$$

where $\mu_0 = 4\pi 10^{-7}$ is the permeability of vacuum, N is the number of nano-particles per volume, and m is the net moment of the nano-particle. For the case of $(\mu_0 mH/k_B T) = 1$, the relative moment (normalized to the full moment of the nano-particle) can be written as:

$$|M/Nm| = \mu_0 mH/3k_B T$$

or as the initial magnetic susceptibility $\chi$ $$\chi = M/H = N\mu_0 m^2 / 3k_B T$$

Note that $\chi$ has a quadratic dependence on the moment m of the individual nano-particles. Therefore, a change $M_S$ will correspond to a larger change in the observed read-back signal, which is proportional to $\chi H$.

For a typical nano-particle with a diameter d=4 nm and a saturation magnetization of $M_s$=800 emu/cm$^3$, the moment $m_{mod}$=($\pi$/6) d$^3M_s$=26.8 10$^{-18}$ emu. For the same nano-particles the measured value was $M_s$=200 emu/cm$^3$ in the as-prepared state, which would correspond to $m_{ini}$=6.7 10$^{-18}$ emu for a 4-nm-diameter nano-particle.

The (maximum) applied magnetic field is chosen such that $\mu_0 mH/k_B T$=1 for the modified nano-particles. In the present example and using T=300 K, this results in a relatively easy to achieve field of H=123 kA/m (=1.54 kOe). The moment that will be sensed by the read-back device is $M_{mod}$=0.313 $m_{mod}$=8.39 10$^{-18}$ emu (per nano-particle). For the non-modified nano-particles, this moment is $M_{ini}$=0.083 $m_{ini}$=0.56 10$^{-18}$ emu (per nano-particle). The contrast ratio is ($M_{mod}-M_{ini})/M_{ini}$100%=1400%.

Note that present read-back devices are designed to be sensitive to moments of the order of $M_{present}$=1.55 10$^{-15}$ emu (taking 10% of the volume of a bit-cell with an area A=2,581 nm$^2$ [corresponding to a bit-density of 250 Gbit/in$^2$], a thickness t=10 nm, and an $M_s$=600 emu/cm$^3$), which is 185 times larger than for the signal of a single modified nano-particle. Assuming that the full positive to negative swing of a present medium corresponds to a signal-amplitude of 5 mV, the paramagnetic signal would correspond to a signal-amplitude of 13 $\mu$V (or 9 $\mu V_{rms}$ for ac detection.

The following example explains in detail the concept of removing a surfactant coating from an as deposited nano-particle structure and, particularly for self-assembled, mono-disperse L1$_0$ FePt nanoparticles for forming a magnetic data storage media, such as magnetic recording medium 14. The chemically ordered L1$_0$ phase of the FePt system is of particular interest, because of its high bulk magnetocrystal-line anisotropy energy density ($K_u$~6.6×10$^7$ ergs/cm$^3$) at the equiatomic composition that should allow the use of smaller, thermally stable magnetic grains than is generally used in current recording media.

In one embodiment of the present invention, there is provided a magnetic recording system that alters and detects saturation magnetic moment for recording information. Thus, this example concentrates on the saturation magnetization, $M_S$. In Fe$_{50}$Pt$_{50}$ thin films, $M_S$ is about 1125 emu/cm$^3$, close to the bulk value $M_S$=1140 emu/cm$^3$. Techniques for these measurements are well established. In chemically synthesized, surfactant-coated FePt nanoparticle systems, however, quantitative Ms measurements are complicated by the difficulty of determining weights or volumes without introducing large errors. We provide a systematic study of $M_S$ of FePt nanoparticle systems at different annealing temperatures and constant annealing time (30 minutes). The amount of the material is characterized by weighing the FePt nanoparticles (~1 mg with 0.1 $\mu$g accuracy) after the surfactant coating decomposes at temperatures T$\geq$400° C.

Figure 4A:
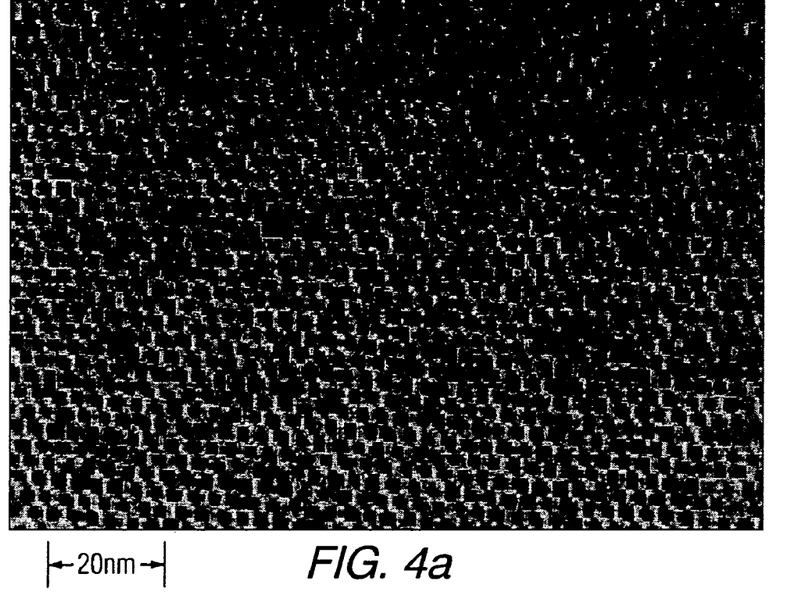
FIG. 4(a) is a transmission electron microscope (TEM) image of an FePt nanoparticle sample.
Figure 4B:
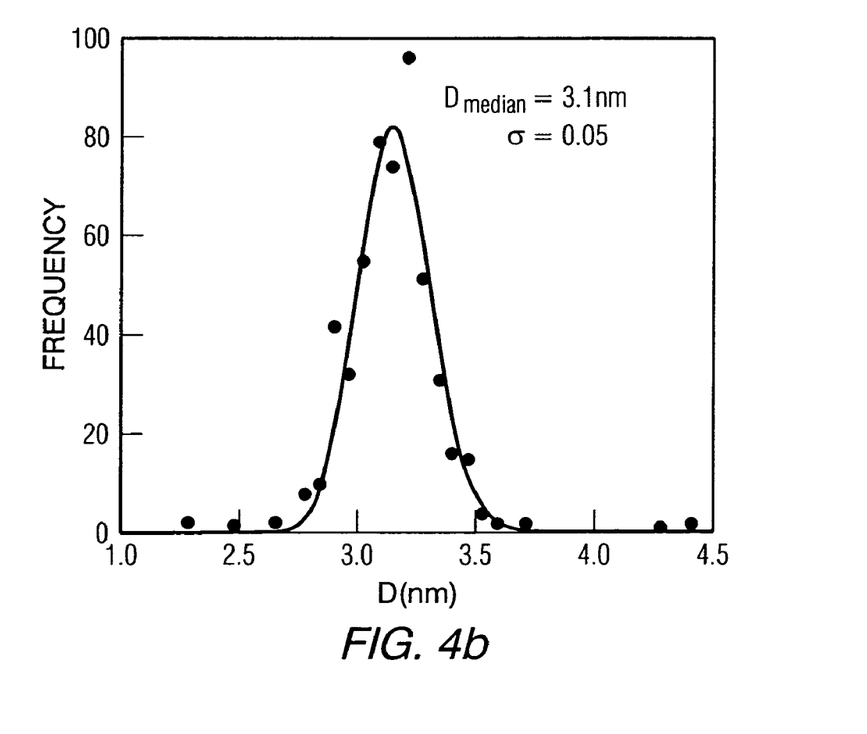
FIG. 4(b) is a graphical illustration of particle diameter distribution for the FePt nanoparticles illustrated in FIG. 4(a).

The present assemblies of FePt nanoparticles are synthesized using techniques that are known. Thermally oxidized silicon coupons are used as substrates. FIG. 4(a) shows a plan-view transmission electron microscope (TEM) image of a representative assembly. A median particle diameter of 3.1 nm with 0.15 nm standard deviation ($\sigma$=0.05) is formed (FIG. 4(b)). The as-prepared samples are then annealed in a Rapid Thermal Annealing furnace (RTA) under argon environment at various temperatures $T_{anneal}$=250° C.~650° C. to induce L1$_0$ chemical ordering and to generally explore changes in magnetic and micro-structural properties. The inert argon environment during annealing prevents external oxidation or reduction of the FePt nanoparticles. The annealing time is fixed at 30 minutes for all the samples. Magnetic measurements are performed using a Superconducting Quantum Interference Device magnetometer (SQUID) with 50 kOe field range. All measurements reported here are carried out at low temperatures (T$\leq$30 K) to avoid complications due to size dependent superparamagnetic effects.

In order to characterize the total mass of the FePt nanoparticles, a Thermogravimetric Analyzer (TGA) is used to measure the weight and to monitor the weight change of the FePt nanoparticles/surfactant systems as function of annealing temperature. The TGA used is a TA Instrument (TGA-2950) with 0.1 $\mu$g weight resolution. Since the range of the FePt solution weight used for magnetization measurements is from 0.5 mg~3 mg, the error bar due to instrument resolution is negligible. The sample is placed on a Pt sample pan in the TGA chamber and is then heated to temperatures up to 650° C. at controlled scan rate up to 10° C./min. Nitrogen gas is flushed through the TGA chamber to remove oxygen. The weight change is monitored in-situ during heating.

Figure 5A:
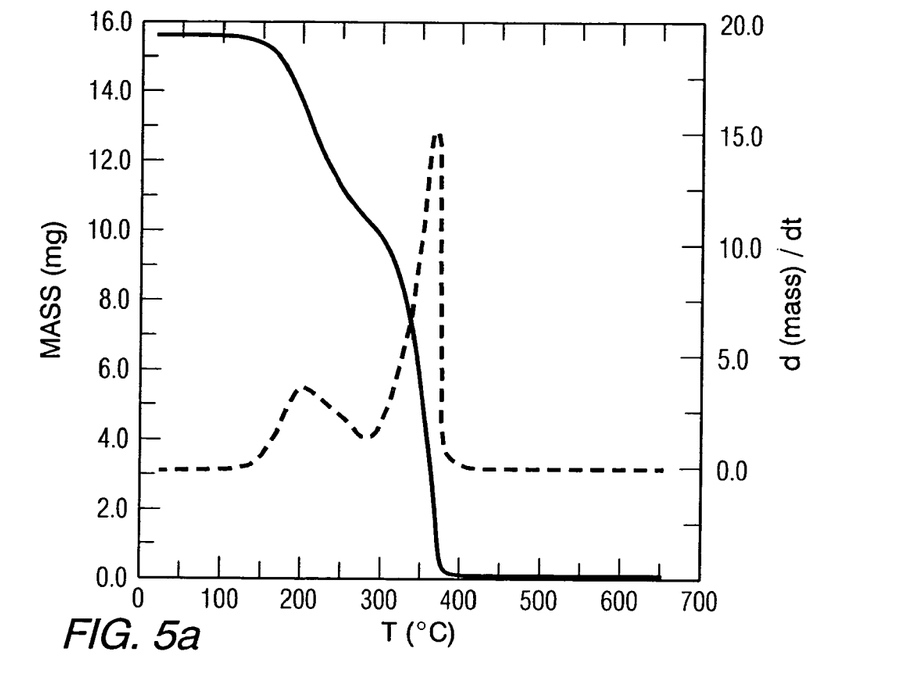
FIG. 5(a) is a graphical illustration of weight loss rate for a surfactant coating material.

The example first investigates a surfactant-only sample. A few drops (about 16 mg) of the oleyl acid/oleylamine 50:50 surfactant mixture are put directly into the sample pan. The measured weight starts dropping at about 150° C. indicating the onset of surfactant decomposition. A modest weight reduction in the range 150 to 300° C. is followed by a more dramatic drop above 300° C., reaching zero at about 400° C. (shown in FIG. 5(a)). The weight-loss-rate, also shown in FIG. 5(a), shows a small peak at about 200° C., followed by a distinct peak at about 350° C. The weight loss is, besides surfactant decomposition, also believed to be at least partially due to evaporation.

Figure 5B:
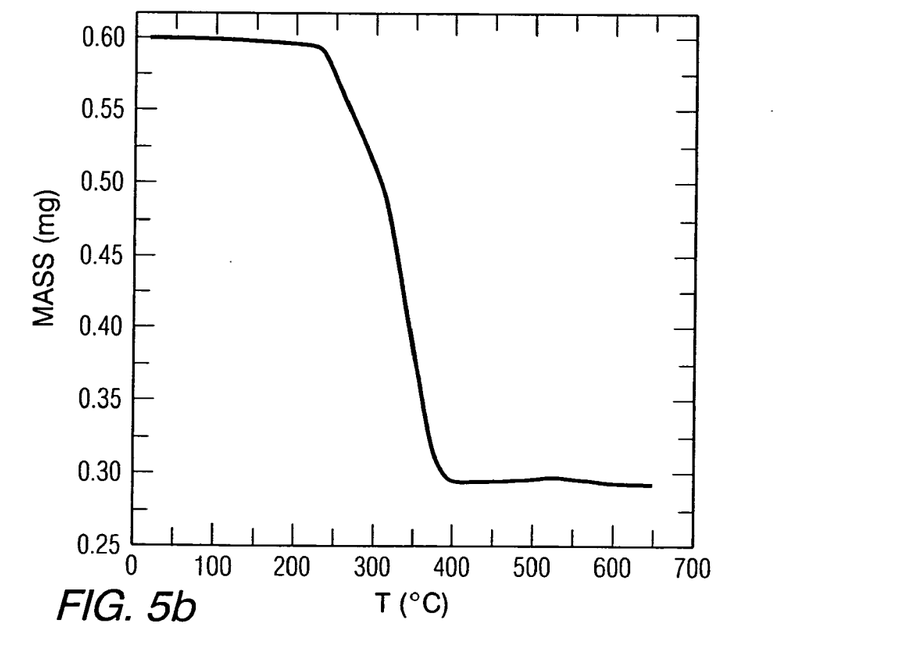
FIG. 5(b) is a graphical illustration of weight loss rate for a FePt nanoparticle solution deposited onto a silicon wafer and measured by a thermogravimetric analyzer (TGA).

FIG. 5(b) shows the TGA weight-loss observed for a FePt nanoparticle film deposited on a silicon wafer. The total initial weight of the solution is about 0.6 mg. The temperature trace is very similar to that of the pure surfactant with major weight-loss occurring near 350° C. and a weak shoulder observable near 250° C. Both features can be attributed to the decomposition (or evaporation) of the surfactant. After heating to T$\geq$400° C., the weight has stabilized. This suggests that the weight left behind after annealing at $T_{anneal}$$\geq$400° C., which is about 50% of the initial weight, is attributable to FePt nanoparticles. The example also studied bare silicon substrates and found weak weight-loss of less than ~0.4% of the silicon weight, which is attributed to evaporation of moisture (water). This weak weight-loss from the silicon substrate is taken into account in quantifying the weight of FePt, assuming that it behaves in a consistent manner from sample to sample. The maximum possible error resulting from this assumption is about ±5%.

Figure 6:
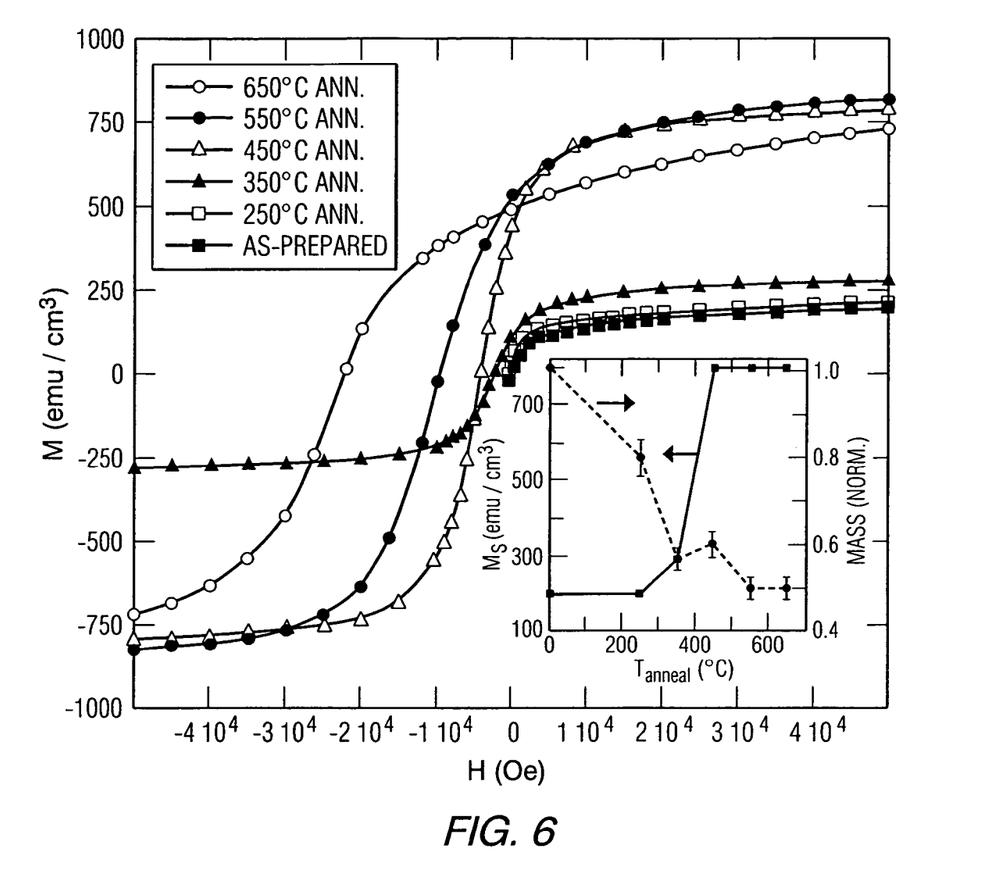
FIG. 6 is a graphical illustration of magnetization data for various annealing conditions.

FIG. 6 shows a series of low temperature (T=5K) SQUID magnetization data (half hysteresis curves) for various annealing conditions. In order to convert from moment per unit mass (emu/g) to moment per unit volume (emu/cm$^3$), the example starts with a FePt bulk density of 15 g/cm$^3$, which is the average of Fe and Pt mass densities. Because of the lower atomic weight of Carbon, the total mass density (g/cm$^3$) is only reduced by an estimated 6–8% to 13.8–14.1 g/cm$^3$. Another uncertainty for mass density arises from the possibility that the mass density within the surface region of the nanoparticles is different from that in the interior. Assume, e.g. a 4% surface lattice constant change and take into account that about 30% of Fe and Pt atoms in a 3.1 nm diameter FePt nanoparticle reside within the first surface atomic layer, then the total particle volume change associated with such a possible surface effect is only of the order of 3–4%. This lies well within the error bar of the present measurement. For simplicity we assume a mass density of 14 g/cm³ in the following.

The coercivity $H_C$ increases from less than 200 Oe for the as-prepared sample to 22 kOe for the sample annealed at $T_{anneal}$=650° C., a sharp onset of coercivity occurring near 350° C. For $T_{anneal} \geq 450°$ C., the magnetization at 50 kOe is about 850 emu/cm³, 25% lower than the $M_s$ of bulk FePt. This discrepancy could partly be due to the fact that at 50 kOe magnetic field, the sample is not yet fully saturated. However, for the sample annealed at $T_{anneal} \leq 450°$ C., the magnetization is significantly reduced. The as-prepared sample has a magnetization of only about 210 emu/cm³, 19% of the bulk value for FePt. The critical annealing temperature to cause a significant increase of the saturation magnetization is about 450° C., which is consistent with the surfactant decomposition temperature. The annealing temperature dependence of the magnetization, along with the weight reduction for these RTA annealed samples is shown in the inset to FIG. 6. A clear correlation between the magnetization and the weight loss of the sample (decomposition of the surfactant) exists. It is noted that differences, e.g. in the onset temperature for the enhanced $M_S$ ($\approx$450° C.) and the weight-loss peak ($\approx$400° C.) may be related to differences in the annealing conditions in RTA and TGA.

The present findings are interpreted as due to the presence of strong interactions between the surfactant and the nanoparticle surface in the as-prepared state. Preliminary density functional calculations indicate that these surface bonding interactions take place predominately at surface iron sites, which is the primary contributor to the magnetization in FePt. The mechanism of bonding to the nanoparticle surface depends on many parameters; however, surface geometry and electronic structure are perhaps the most important factors which determine the location and strength of the surface bond. Metal surfaces containing available d-bands are known to interact with small molecules having accessible $\pi^*$ states through a Blyholder type interaction. For example, this interaction in carbonyl-based molecules weakens the C—O bond through charge donation from the metal d-band into this unoccupied anti-bonding state, thereby weakening the bond. Preliminary spin polarized density functional theory results from cluster models of the FePt (111) surface, which include a small molecule model of the oleylamine surfactant, show that charge is transferred to the surface Fe site from the model oleylamine, thereby lowering the atomic magnetization by about 60% at the Fe site, which is consistent with the previously described bonding mechanism and the observed decrease in magnetization of the nano-particles described above.

On increasing the annealing temperature to 400° C., the surfactant starts to decompose and leaves the particle surface, breaking the bonding between the surfactant and the particles. Without the dead layer from the surfactant—particle interaction, the nanoparticle system recovers its full magnetization.

Figure 7:
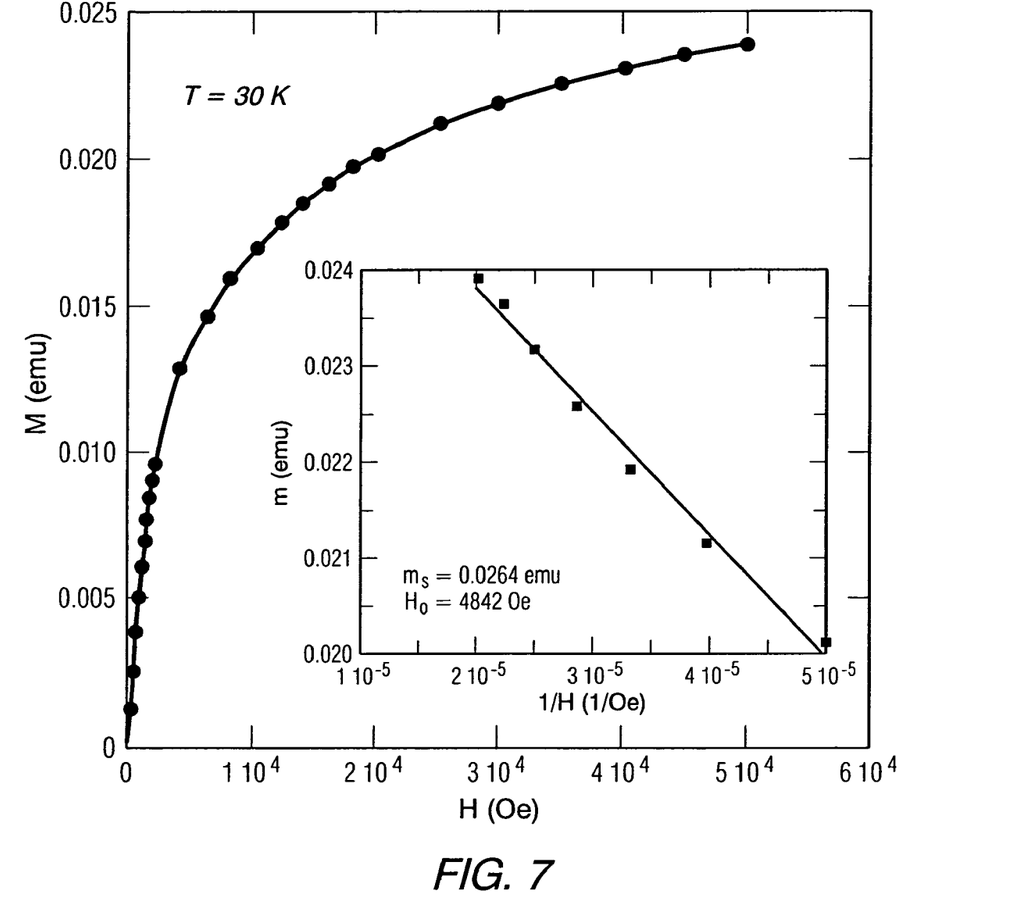
FIG. 7 is a graphical illustration of a magnetization curve for use in estimating particle size.

It is well established that the "magnetic" particle size can be estimated by fitting to the Langevin function in the superparamagnetic regime. The Zero-Field-Cooled (ZFC) and Field-Cooled (FC) magnetization curves show a blocking temperature $T_B$=12K for as-prepared FePt samples in a magnetic field of 200 Oe. In order to estimate the particle size from the Langevin function, the magnetic field dependence of the magnetization curve is measured at $T>T_B$. In this case, T=30K is used (shown in FIG. 7). The magnetic moment per particle is then estimated by:

$$M_S V = \frac{3kT}{2} \sqrt{\frac{\chi_i}{3m_S} \frac{1}{H_0}} \tag{1}$$

where $\chi_i$ is the initial susceptibility of the magnetization curve ($\chi_i$=6.5×10⁻⁶ emu/Oe for this particular case) and $m_s$ is the saturation magnetic moment (in units of emu). In order to extrapolate $m_s$, the magnetic moment m is plotted against 1/H. For superparamagnetic materials, the relationship between m and 1/H for large field should be linear with m=$m_s$ at 1/H→0 and m=0 at 1/H=1/$H_0$. The inset to FIG. 7 shows the m vs. 1/H plot for this particular sample for H>20 kOe. The linear extrapolation gives rise to $m_s$=0.0264 emu and $H_0$=4842 Oe. Using Equation (1), we obtain the $M_s V$=172 $\mu_B$/particle for an as-prepared FePt sample. Consequently, the diameter of the "magnetic" particle size can be calculated to be $D_{mag}$=1.7 nm using $M_s$=850 emu/cm³. For the as-prepared sample with a saturation magnetization of 210 emu/cm³, the ratio of the magnetic volume and physical volume for the particle $V_{mag}/V_{particle}$=$M_{S,bulk}$/$M_{S,particle}$=25%. The particle diameter are therefore $D_{mag}$/$D_{particle}$=(0.25)^{1/3}=0.63, resulting in a physical particle diameter $D_{particle}$=2.7 nm and a dead layer thickness of 0.5 nm.

In conclusion of this example, it is observed that a 75% magnetization reduction for as-prepared FePt nanoparticle samples in comparison with the samples annealed at high temperatures. The strong correlation between magnetization recovery temperature ($\geq$400° C.) and surfactant decomposition temperature (350° C.~400° C.) suggests that the chemical interaction between Fe and surfactant at the particle is responsible for this dramatic magnetization reduction. A Langevin function analysis for as-prepared FePt particles suggests a core-shell structure of the 2.7 nm diameter FePt particles with a 0.5 nm non-magnetic shell.

Whereas particular embodiments of this invention have been described above for purposes of illustration, it will be evident to those skilled in the art that numerous variations of the details of the present invention may be made without departing from the invention as defined in the appended claims.

What is claimed is:

1. A magnetic recording system, comprising:

a recording medium including a substrate having adjacent thereto at least one of both surfactant coated nanoparticles and non-surfactant coated nanoparticles, wherein said surfactant coated nanoparticles and said non-surfactant coated nanoparticles are magnetic, said surfactant coated nanoparticles representing first bits of recorded information and said non-surfactant coated nanoparticles representing second bits of recorded information;

means for writing the first and second bits of recorded information; and means for reading the first and second bits of recorded information.

2. The system of claim 1, wherein said surfactant coated nanoparticles have a first saturation magnetic moment and said non-surfactant coated nanoparticles have a second saturation magnetic moment.

3. The system of claim 2, wherein said first saturation magnetic moment is less than said second saturation magnetic moment.

4. The system of claim 2, wherein said means for reading the first and second bits of recorded information includes means for detecting the first saturation magnetic moment of said surfactant coated nanoparticles and the second saturation magnetic moment of said non-surfactant coated nanoparticles to read the first and second bits of recorded information, respectively.

5. The system of claim 1, wherein said means for reading the first and second bits of recorded information includes means for detecting the surfactant coated nanoparticles and means for detecting the non-surfactant coated nanoparticles.

6. The system of claim 1, wherein said means for writing the first and second bits of recorded information includes means for removing the surfactant coating from the surfactant coated nanoparticles.

7. The system of claim 1, wherein the nanoparticles portion of the surfactant coated nanoparticles are formed of FePt, CoPd, Co, CoFe, Fe or Ni.

8. The system of claim 7, wherein the nanoparticles portion have a diameter have a diameter in the range of about 2 nm to about 8 nm.

9. The system of claim 1, wherein the surfactant coated portion of the surfactant coated nanoparticles is formed of oleic-acid molecules or thiols.

10. The system of claim 1, wherein the surfactant coated nanoparticles have a diameter in the range of about 4 nm to about 12 nm.

* * * * *

UNITED STATES PATENT AND TRADEMARK OFFICE
CERTIFICATE OF CORRECTION

PATENT NO.         : 7,029,773 B2                                    Page 1 of 1
APPLICATION NO. : 10/683383
DATED              : April 18, 2006
INVENTOR(S)        : Rene J.M. van de Veerdonk, Xiaowei Wu and Dieter K. Weller It is certified that error appears in the above-identified patent and that said Letters Patent is hereby corrected as shown below:

On The Title Page, Item -56-

U.S. Patent Documents

"6,302,940 B1" should read --6,302,940 B2--

Title Page, Item -56-

Other Publications

"vol. 34" should read --Vol. 34--

Column 4, Line 56

"nano-particles,..." should read --nanoparticles,...--

Column 4, Line 67

"$M/Nm = \mu_0 mH/3k_B T$" should read --$|M/Nm| = \mu_0 mH/3k_B T$--

Signed and Sealed this

Fifth Day of June, 2007

JON W. DUDAS
*Director of the United States Patent and Trademark Office*